United States Patent
Li et al.

(10) Patent No.: US 9,488,070 B2
(45) Date of Patent: Nov. 8, 2016

(54) TURBINE END INTAKE STRUCTURE FOR TURBOCHARGER, AND TURBOCHARGER COMPRISING THE SAME

(71) Applicant: HONEYWELL INTERNATIONAL INC., Morristown, NJ (US)

(72) Inventors: Penny Li, Shanghai (CN); Ronglei Gu, Shanghai (CN); Rong Zhang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 696 days.

(21) Appl. No.: 13/920,145

(22) Filed: Jun. 18, 2013

(65) Prior Publication Data

US 2013/0343880 A1  Dec. 26, 2013

(30) Foreign Application Priority Data

Jun. 21, 2012 (CN) .................. 2012 2 0294611 U

(51) Int. Cl.
  *F01D 25/14*  (2006.01)
  *F01D 9/02*  (2006.01)
  *F02C 6/12*  (2006.01)

(52) U.S. Cl.
  CPC ............ *F01D 25/145* (2013.01); *F01D 9/026* (2013.01); *F02C 6/12* (2013.01); *F05D 2220/40* (2013.01)

(58) Field of Classification Search
  CPC ........ F01D 25/145; F01D 9/026; F02C 6/12; F05D 2220/40
  USPC ....................................... 415/206
  See application file for complete search history.

(56) References Cited

U.S. PATENT DOCUMENTS

| | | | |
|---|---|---|---|
| 3,232,043 A | * | 2/1966 | Birmann ................. F02B 37/24 |
| | | | 417/406 |
| 3,734,650 A | | 5/1973 | Reisacher et al. |

(Continued)

FOREIGN PATENT DOCUMENTS

| EP | 0 781 908 A2 | 7/1997 |
|---|---|---|
| WO | WO 2011/067259 A1 | 6/2011 |

OTHER PUBLICATIONS

European Search Report for Application No. EP 13 17 2509 dated Jun. 11, 2014.

(Continued)

*Primary Examiner* — Igor Kershteyn
*Assistant Examiner* — Aaron R Eastman
(74) *Attorney, Agent, or Firm* — John C. James

(57) ABSTRACT

A turbine end intake structure for a turbocharger includes a turbine housing, a turbine having multiple blades and located in a turbine shell, and thermal insulation located between the turbine end of the turbocharger and another part. A flow-guiding channel for engine exhaust gases is provided on the turbine housing in communication with the interior of the turbine housing. An inner surface of the turbine housing matching peripheral edges of the blades is a cylindrical surface coaxial with the turbine, while the shape of the peripheral edges of the blades follows the cylindrical surface. Angle-cut portions are provided on the blades at positions corresponding to an intake port of the flow-guiding channel. The thermal insulation has an outwardly extending flow-guiding part, and a flow-guiding path for engine exhaust gases formed by the flow-guiding channel and the flow-guiding part is perpendicular to the angle-cut portions of the blades.

9 Claims, 2 Drawing Sheets

(56) References Cited

U.S. PATENT DOCUMENTS

| | | | |
|---|---|---|---|
| 4,565,505 | A | 1/1986 | Woollenweber |
| 4,776,168 | A | 10/1988 | Woollenweber |
| 5,025,629 | A | 6/1991 | Woollenweber |
| 5,094,587 | A | 3/1992 | Woollenweber |
| 5,498,128 | A | 3/1996 | Baets et al. |
| 6,877,955 | B2 | 4/2005 | Higashimori et al. |
| 2002/0184882 | A1 | 12/2002 | Daudel et al. |
| 2010/0104233 | A1* | 4/2010 | Bando .................... F01D 25/16 384/490 |
| 2010/0232959 | A1* | 9/2010 | Takei ...................... F16C 17/18 415/229 |
| 2011/0171016 | A1* | 7/2011 | Claude .................... C21D 5/00 415/200 |

OTHER PUBLICATIONS

Office Action for European Application No. EP 13 17 2509 dated Aug. 4, 2014.

* cited by examiner

TURBINE END INTAKE STRUCTURE FOR TURBOCHARGER, AND TURBOCHARGER COMPRISING THE SAME

TECHNICAL FIELD

In summary, the present utility model relates to the technical field of combustion engine turbochargers. More specifically, the present utility model relates to a turbine end intake structure for a turbocharger, and further to a turbocharger comprising such a turbine end intake structure.

BACKGROUND ART

Turbocharging is now a technology that is becoming more mature with each passing day. The turbocharger in a combustion engine (such as a car engine) is a type of air compressor, which uses the engine exhaust gases to drive a turbine in a turbine housing at the turbine end; the turbine drives a coaxial compressor wheel in a compressor housing at the compressor end so as to deliver air under pressure, increasing the pressure of the air entering the engine cylinders. The use of a turbocharger in a combustion engine helps to increase the engine output power, but a lag in motive power output response due to the inertia of the impeller is a shortcoming thereof.

To mitigate the shortcoming of turbocharged engines in having a lag in output response, a number of solutions have been proposed in the prior art.

EP0781908A2 has disclosed the structure of a turbocharger 100. As shown in FIG. 1, engine exhaust gases arrive at a turbine 103 directly, guided by a gas channel 102 in a turbine housing 101. Moreover, the direction in which the force is applied when the exhaust gases enter the turbine end and drive the turbine 103 is not uniform, and the optimal angle for the driving force is not achieved. This structure for guiding the flow of exhaust gases in the turbocharger 100 affects the dynamic properties of the air, and is unable to achieve efficient use of the exhaust gas energy. It can be appreciated that in such a situation, alteration of the traditional turbine housing structure would pose a problem in terms of very high costs, which in turn would compromise the competitiveness of the product in the commercial market.

U.S. Pat. No. 3,232,043 has disclosed a turbocharger 200 system. As shown in FIG. 2, the engine exhaust gases arrive at a turbine 203 directly, guided by an arcuate gas channel 202 in a turbine housing 201, while the top edges of the turbine 203 extend in a corresponding arc shape, ultimately making the structure of the turbine housing 201 extremely complex. This makes product design and production difficult, with the corresponding costs being higher. The same problem is faced when machining the turbine 203.

It can be appreciated from the foregoing that there are still many problems in urgent need of solution in the prior art of the field to which the invention belongs.

Content of the Utility Model

The technical problem which the present utility model seeks to solve is the provision of a turbine end intake structure for a turbocharger, and a turbocharger comprising such a turbine end intake structure, which help to reduce turbocharger turbine lag and hence mitigate the problem posed thereby, while overcoming such shortcomings in the prior art as complex design and production and high costs.

To solve the above problem, according to one aspect of the present invention a turbine end intake structure for a turbocharger is provided, the turbine end intake structure comprising a turbine housing, a turbine which has multiple blades and is located in the turbine shell, and a thermal insulation means located between the turbine end of the turbocharger and another part, wherein a flow-guiding channel for engine exhaust gases is provided on the turbine housing in communication with the interior of the turbine housing, and wherein an inner surface of the turbine housing matching peripheral edges of the blades is a cylindrical surface coaxial with the turbine, while the shape of the peripheral edges of the blades follows the cylindrical surface;

angle-cut portions are provided on the blades at positions corresponding to an intake port of the flow-guiding channel, the thermal insulation means has an outwardly extending flow-guiding part, and a flow-guiding path for engine exhaust gases formed by the flow-guiding channel and the flow-guiding part is perpendicular to the angle-cut portions of the blades.

With a turbine end intake structure set up in this way, exhaust gases drawn into the turbine housing push on the angle-cut structure of the turbine perpendicularly, while the angle-cut blades help to reduce the rotational inertia of the turbine rotor part; thus maximum operational efficiency of turbocharging can be achieved, with a consequent reduction in turbine lag. Furthermore, the cylindrical surface design employed for the inner surface of the turbine housing and the corresponding parts on the periphery of the blades is easy to machine and process. Guiding the flow of exhaust gases to the turbine by means of a thermal insulation plate in combination with a flow-guiding channel on the turbine housing, with no need to alter the traditional turbine housing, avoids a turbine housing design and production solution which is complex in use.

Optionally, in the turbine end intake structure described above, an outer peripheral edge of the flow-guiding part of the thermal insulation means lies in a direction tangential to an inner surface of the flow-guiding channel, while an inner peripheral edge thereof lies in a direction perpendicular to the angle-cut portions of the turbine. With a turbine end intake structure set up in this way, the exhaust gases can still flow smoothly when passing the point where the flow-guiding channel meets the flow-guiding part of the thermal insulation means, and under the flow-guiding action of the thermal insulation means enter the turbine perpendicularly to drive the blades thereof, achieving maximum operational efficiency and helping to reduce turbine lag.

Optionally, in the turbine end intake structure described above, the flow-guiding part of the thermal insulation means is an integral component of the thermal insulation means. With a turbine end intake structure set up in this way, the flow-guiding part is made integrally with the thermal insulation means during machining, saving on machining and production steps. Moreover, an integral construction is better able to guarantee a long service life for the flow-guiding part and increase the stability of operation of the entire system.

Optionally, in the turbine end intake structure described above, the thermal insulation means is an annular thermal insulation plate. With a turbine end intake structure set up in this way, the thermal insulation means is easy to machine, convenient to install and use, and has stable performance.

Optionally, in the turbine end intake structure described above, there is only one said flow-guiding channel.

Optionally, in the turbine end intake structure described above, there is more than one said flow-guiding channel, and intake ports thereof on the turbine housing are distributed uniformly around the circumference of the turbine housing. With a turbine end intake structure set up in this way, the engine exhaust gases drive the blades of the turbine at positions distributed uniformly around the circumference of the turbine, so that the force acting on the turbine is uniform overall and the operational efficiency is higher, leading to a marked increase in the efficiency of turbocharging, helping to reduce turbine drag and improving stability of operation.

Optionally, in the turbine end intake structure described above, the turbine is connected to a compressor wheel at a compressor end via a rotor of the turbocharger.

According to a second aspect of the present utility model a turbocharger is provided, a turbine end of the turbocharger being provided with the turbine end intake structure described in one of the above variations of the first aspect of the present utility model. It can be appreciated that a turbocharger set up in this way will have corresponding advantages of the turbine end intake structure described above. For example, exhaust gases drawn into the turbine housing push on the angle-cut structure of the turbine perpendicularly, so that maximum operational efficiency of turbocharging can be achieved, with a consequent reduction in turbine lag. Furthermore, the cylindrical surface design employed for the inner surface of the turbine housing and the corresponding parts on the periphery of the blades is easy to machine and process. Guiding the flow of exhaust gases to the turbine by means of a thermal insulation plate in combination with a flow-guiding channel on the turbine housing, with no need to alter the traditional turbine housing, avoids a turbine housing design and production solution which is complex in use, and so on.

Optionally, in the turbocharger described above, a rotor bearing of the turbocharger is a low-friction bearing. With a turbocharger set up in this way, the bearing has reduced internal resistance and increased operational sensitivity, helping to mitigate turbine lag.

Optionally, in the turbocharger described above, the low-friction bearing is a ball bearing.

DESCRIPTION OF THE ACCOMPANYING DRAWINGS

The disclosed content of the present utility model will become clearer when the accompanying drawings are referred to. It should be understood that these drawings are merely schematic, and by no means intended to limit the scope of the present utility model. In the drawings.

PARTICULAR EMBODIMENTS

Particular embodiments of the present utility model are described in detail below with reference to the accompanying drawings. These descriptions are merely descriptive and illustrative.

Figure 1:
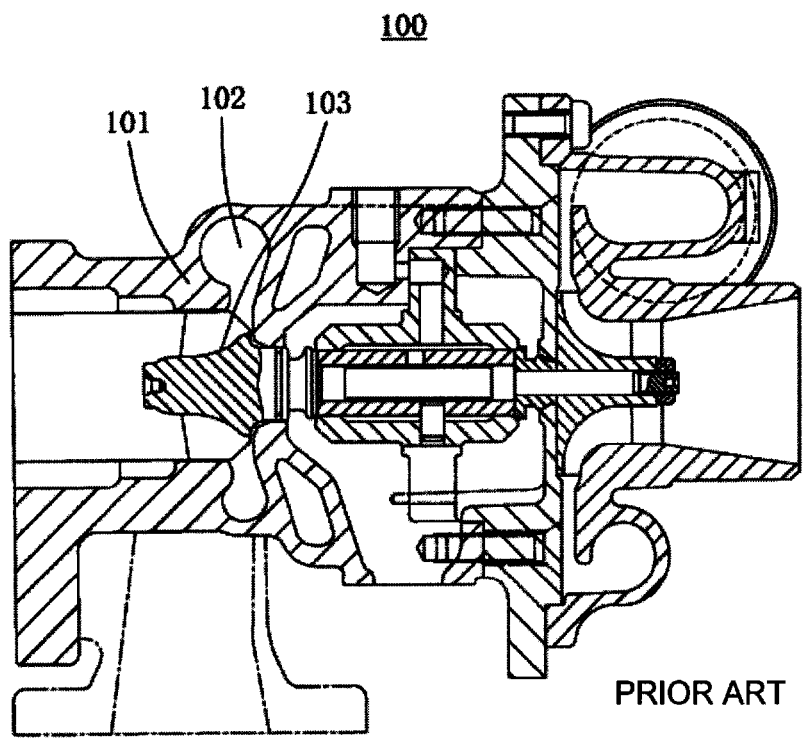
FIG. 1 is a schematic diagram of an axial section of a turbocharger in the prior art.
Figure 2:
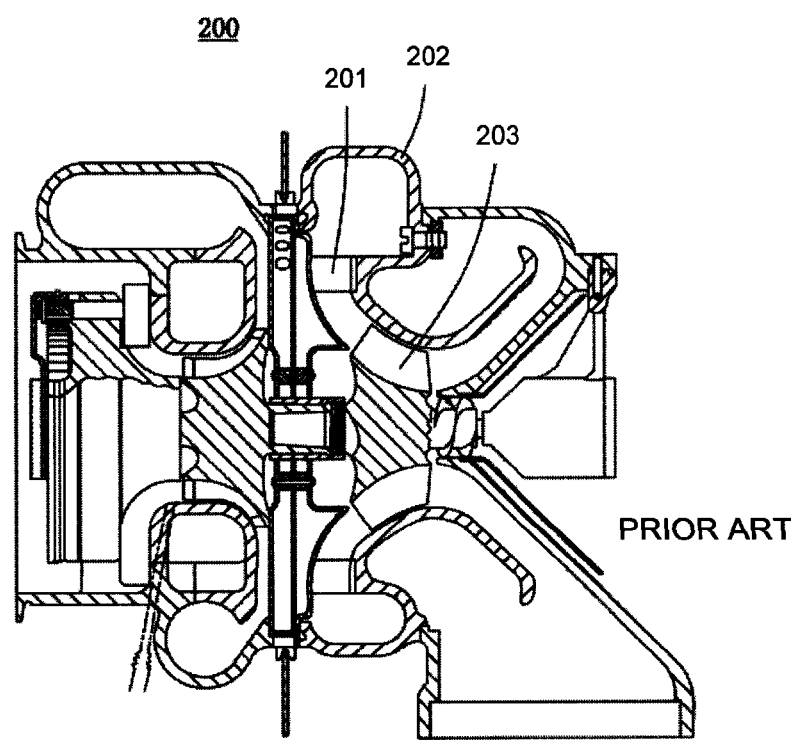
FIG. 2 is a schematic diagram of an axial section of another turbocharger in the prior art.
Figure 3:
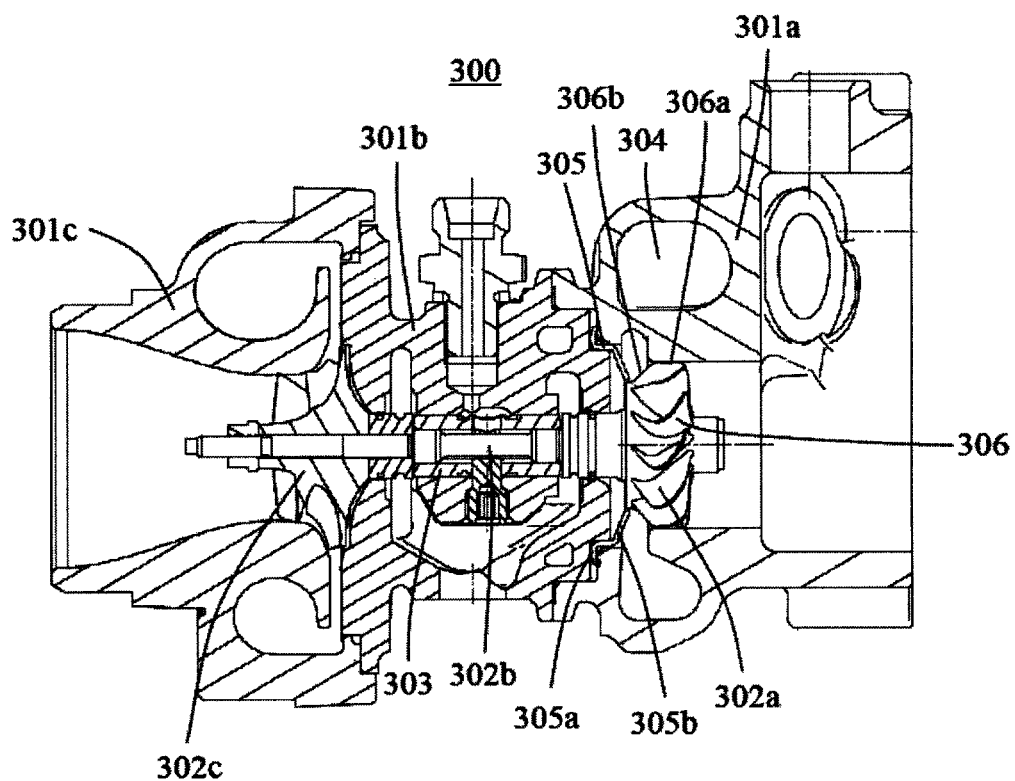
FIG. 3 is a schematic diagram of an axial section of the turbocharger according to an embodiment of the present utility model.

FIG. 3 is a schematic diagram of an axial section of the turbocharger according to an embodiment of the present utility model. It can be seen from the drawing that, similarly to a traditional turbocharger, the turbocharger 300 according to this embodiment has a turbine end, a middle portion and a compressor end. A turbine 302a is arranged in a turbine housing 301a at the turbine end, a compressor wheel 302c is arranged in a compressor housing 301c at the compressor end, and a rotor 302b is arranged in a middle housing 301b in the middle portion. The rotor 302b is fitted in the middle housing 301b via a bearing 303 assembly, and secured at its two ends to the turbine 302a and the compressor wheel 302c, respectively. During operation of the turbocharger 300, engine exhaust gases enter the turbine housing 301a through a flow-guiding channel 304 on the turbine housing 301a, and turn the turbine 302a. The rotation of the turbine 302a in turn drives the rotation of the rotor 302b and compressor wheel 302c, the rotation of the compressor wheel 302c compressing air into the engine cylinders (not shown).

Those skilled in the art should understand that since the turbine end intake structure of the present utility model has the advantage of being able to be integrated in a conventional turbocharger, the specific structure of the compressor end and middle portion of the turbocharger is not restricted by the content of this text. For example, the rotor 302b of the turbocharger 300 is mounted in a long axial hole in the middle housing 301b by means of a bearing 303, which can be of a conventional design; to reduce the internal resistance of the bearing and increase the operational sensitivity thereof, and in turn mitigate turbine lag beneficially, the bearing 303 may preferably be a low-friction bearing. For example, the low-friction bearing may be a ball bearing or fully floating bearing, etc.; no further examples are listed here.

FIG. 3 also shows in detail the turbine end intake structure of turbocharger 300 according to the present utility model. It can be seen from the drawing that the turbine end intake structure comprises a turbine housing 301a, a turbine 302a and a thermal insulation means 305. The turbine 302a has multiple blades 306, is located in the turbine housing 301a and fixed to the rotor 302b of the turbocharger 300, and turns the rotor 302b and compressor wheel 302c together to perform work when driven by engine exhaust gases. To prevent excessive heat transfer from the turbine end to the middle portion and compressor end of the turbocharger 300, the thermal insulation means 305 is arranged between the turbine end and middle portion of the turbocharger 300, and can for example be made of sheet material (but is not limited to this); it can be integrated with the flow-guiding channel 304 to form a flow-guiding path for engine exhaust gases, guiding the exhaust gases into the turbine. In the particular embodiment shown in the drawing, the thermal insulation means 305 has a thermal insulation part 305a for thermal insulation of the turbine end, and a flow-guiding part 305b extending from the thermal insulation part 305a. The flow-guiding part 305b and the flow-guiding channel 304 of the turbine housing 301a are integrated so as to guide the flow of exhaust gases to the turbine 302a. Since such an arrangement obviates the need to alter the traditional turbine housing, it reduces costs effectively compared with the use of a complex turbine housing design. Moreover, the relative convenience of design and production of the thermal insulation means 305 with the flow-guiding part 305b enhances the adaptability thereof; it can be altered flexibly according to the situation (for instance by adjusting the angle and direction) to suit the requirements of actual turbochargers.

It can also be seen from the drawings that in this preferred embodiment, to make the flow of exhaust gases smoother, an outer peripheral part of the flow-guiding part 305b of the thermal insulation means 305 is arranged to extend in a direction tangential to an inner surface of the flow-guiding channel 304, while an inner peripheral part thereof is arranged to extend in a direction perpendicular to angle-cut portions (to be described in detail below) 306b of the turbine 302a. Maximum operational efficiency is achieved, helping to reduce turbine lag, because the exhaust gases can still flow smoothly when passing the point where the flow-guiding channel 304 meets the flow-guiding part 305b of the thermal insulation means 305, and under the flow-guiding action of the thermal insulation means 305 enter the turbine 302a perpendicularly to drive the blades 306 thereof. The flow-guiding part 305b can be an integral component of the thermal insulation means 305, made for example by casting or forging/pressing, etc. (for instance, made with an annular shape) This facilitates production and machining, and gives stable operational performance in use.

The flow-guiding channel 304 for engine exhaust gases is arranged on the turbine housing 301a in communication with the interior of the turbine housing 301a, and is typically made into a volute shape encircling the turbine housing 301a. In the particular embodiment shown in the drawing, an inner surface of the turbine housing 301a matching peripheral edges 306a of the blades 306 is a cylindrical surface coaxial with the turbine, while the shape of the peripheral edges 306a of the blades 306 follows the cylindrical surface. It can be appreciated that such blades 306 of turbine 302a have a trim of 100, and are easy to machine.

Although there is only one flow-guiding channel 304 in the drawing, it should be understood that more than one flow-guiding channel could also be provided according to the actual situation, with intake ports of these flow-guiding channels on the turbine housing 301a preferably being distributed uniformly around the circumference of the turbine housing 301a, so that the engine exhaust gases drive the blades 306 of the turbine 302a at positions distributed uniformly around the circumference of the turbine 302a.

Angle-cut portions 306b are provided on the blades 306 at positions corresponding to the intake port of the flow-guiding channel 304. The flow-guiding path for engine exhaust gases formed by the flow-guiding part 305b of the thermal insulation means 305 and the flow-guiding channel 304 is perpendicular to the angle-cut portions 306b of the blades 306. Since exhaust gases drawn into the turbine housing 301a can push on the structure of the angle-cut portions 306b of the turbine 302a perpendicularly, mixed-flow turbocharging is accomplished, which improves the operational efficiency of pressurization compared to purely radial-flow or purely axial-flow turbochargers, while helping to reduce turbine lag. Such a design of blades 306 and flow-guiding path enables the present utility model to reduce the turbine size, as a result of which an inertia reduction of 35-50% can be achieved.

By combining the above it can be seen that the turbocharger according to the present invention will also have corresponding advantages, such as being capable of high operational efficiency in turbocharging, reducing turbine lag by approximately 10%, and having a turbine housing and turbine which are easy to machine and miniaturize. Such a novel turbine structure can be extended to any type of turbocharging application.

Specific illustrative embodiments of the present utility model have been described in detail above with reference to the accompanying drawings. It should be appreciated that it is not the intention of the present application to limit the scope of protection of the present utility model by means of these specific details. The structure and features of the specific illustrative embodiments above can be modified in an equivalent or similar way without departing from the spirit and scope of the present utility model, and such modifications shall fall within the scope of protection determined by the attached claims of the present utility model.

The invention claimed is:

1. A turbocharger comprising:
a turbine housing, a turbine which has multiple blades and is located in the turbine housing, a middle housing fastened to the turbine housing, and a thermal insulation means located between the turbine housing and the middle housing, wherein a flow-guiding channel for engine exhaust gases is provided on the turbine housing in communication with an interior of the turbine housing,
wherein
the interior of the turbine housing defines an inner surface that is a cylindrical surface coaxial with the turbine, the cylindrical surface extending axially toward the middle housing and terminating at a corner where the cylindrical surface intersects an intake port of the flow-guiding channel through which exhaust gases are directed inwardly to the turbine,
the blades of the turbine have peripheral edges that follow the cylindrical surface up to said corner and then angle radially inwardly and axially toward the middle housing so as to form angle-cut portions on the blades at positions corresponding to the intake port of the flow-guiding channel, and
the thermal insulation means has a thermal insulation part disposed between the turbine housing and the middle housing and a flow-guiding part that extends from the thermal insulation part at an angle radially inwardly and axially toward the turbine and that cooperates with the flow-guiding channel so as to form a flow-guiding path for engine exhaust gases that is perpendicular to the angle-cut portions of the blades.

2. The turbocharger as claimed in claim 1, wherein an outer peripheral edge of the flow-guiding part of the thermal insulation means lies in a direction tangential to an inner surface of the flow-guiding channel, while an inner peripheral edge thereof lies in a direction perpendicular to the angle-cut portions of the turbine.

3. The turbocharger as claimed in claim 1, wherein the flow-guiding part of the thermal insulation means is an integral component of the thermal insulation means.

4. The turbocharger as claimed in claim 1, wherein the thermal insulation means is an annular thermal insulation plate.

5. The turbocharger as claimed in claim 1, wherein there is only one said flow-guiding channel.

6. The turbocharger as claimed in claim 1, wherein there is more than one said flow-guiding channel, and intake ports thereof on the turbine housing are distributed uniformly around the circumference of the turbine housing.

7. The turbocharger as claimed in claim 1, wherein the turbine is connected to a compressor wheel at a compressor end via a rotor of the turbocharger.

8. The turbocharger as claimed in claim 1, wherein the middle housing contains a rotor bearing.

9. The turbocharger as claimed in claim 8, wherein the bearing is a ball bearing.

* * * * *